United States Patent
Park et al.

(10) Patent No.: US 10,384,965 B2
(45) Date of Patent: Aug. 20, 2019

(54) SEWAGE TREATMENT SYSTEM USING GRANULE

(71) Applicants: KOREA INSTITUTE OF SCIENCE AND TECHNOLOGY, Seoul (KR); SAMYOUNG GLOBAL, Gyeonggi-do (KR)

(72) Inventors: Chanhyuk Park, Seoul (KR); Yunchul Chung, Seoul (KR); Yongxun Jin, Seoul (KR); Min Kyu Choi, Seoul (KR); Changhyun Ryu, Seoul (KR); Dongkuk Shin, Seoul (KR); Daeyoung Kwon, Seoul (KR)

(73) Assignees: Samyoung Global, Gyeonggi-do (KR); Korea Institute of Science and Technology, Seoul (KR)

( * ) Notice: Subject to any disclaimer, the term of this patent is extended or adjusted under 35 U.S.C. 154(b) by 0 days.

(21) Appl. No.: 15/790,262

(22) Filed: Oct. 23, 2017

(65) Prior Publication Data

US 2019/0092666 A1    Mar. 28, 2019

(30) Foreign Application Priority Data

Sep. 26, 2017   (KR) .................... 10-2017-0124309

(51) Int. Cl.
   *C02F 3/30*   (2006.01)
   *C02F 3/20*   (2006.01)
   (Continued)

(52) U.S. Cl.
   CPC ............ *C02F 3/303* (2013.01); *C02F 3/20* (2013.01); *C02F 3/305* (2013.01); *C02F 3/308* (2013.01);
   (Continued)

(58) Field of Classification Search
   CPC .......... C02F 3/303; C02F 3/308; C02F 3/305; C02F 3/20; C02F 2101/16; C02F 2101/105
   (Continued)

(56) References Cited

U.S. PATENT DOCUMENTS

| 6,177,007 B1* | 1/2001 | Lee .................. C02F 3/308 210/195.1 |
| 6,398,957 B1* | 6/2002 | Mandt .............. C02F 3/1263 210/195.1 |

(Continued)

*Primary Examiner* — Fred Prince
(74) *Attorney, Agent, or Firm* — Huffman Law Group, PC

(57) ABSTRACT

The present invention relates to a sewage treatment system using granules, and more particularly, the sewage treatment system includes: an anoxic tank which has a sewage inlet port into which sewage is introduced; an anaerobic tank which is connected to the anoxic tank; intermittent aeration tanks which are connected to the anaerobic tank, have two or more separately divided spaces, and have, in the spaces, granules and aeration devices that alternately operate; and a settling tank which is connected to the intermittent aeration tanks, and the sewage treatment system is operated by a method including: a first step of introducing sewage; a second step of allowing the introduced sewage to pass through the anoxic tank and to be supplied with carbon; a third step of allowing the sewage passing through the anoxic tank to be introduced into the anaerobic tank; a fourth step of allowing the sewage passing through the anaerobic tank to be introduced into a first intermittent aeration tank and a second intermittent aeration tank which include the aeration devices and the granules including nitrogen treatment microorganisms; a fifth step of allowing the first intermittent aeration tank to be in an aeration state and the second intermittent aeration tank to be in a non-aeration state; and a sixth step of allowing the first intermittent aeration tank to (Continued)

be in the non-aeration state and the second intermittent aeration tank to be in the aeration state.

9 Claims, 1 Drawing Sheet

(51) Int. Cl.
 *C02F 101/10* (2006.01)
 *C02F 101/16* (2006.01)
(52) U.S. Cl.
 CPC .... *C02F 2101/105* (2013.01); *C02F 2101/16* (2013.01)
(58) Field of Classification Search
 USPC ....... 210/605, 615, 616, 617, 630, 252, 259, 210/903
 See application file for complete search history.

(56) References Cited

U.S. PATENT DOCUMENTS

| | | | |
|---|---|---|---|
| 7,407,580 B2* | 8/2008 | You | C02F 3/1273 210/259 |
| 8,585,900 B2* | 11/2013 | Alvarez-Cuenca | C02F 3/301 210/260 |
| 2004/0206699 A1* | 10/2004 | Ho | C02F 3/085 210/605 |
| 2005/0252854 A1* | 11/2005 | Krier | C02F 3/06 210/605 |
| 2008/0116130 A1* | 5/2008 | Devine | B01D 61/16 210/605 |
| 2009/0061509 A1* | 3/2009 | Li | C02F 3/085 435/293.1 |
| 2013/0098815 A1* | 4/2013 | Cho | C02F 3/308 210/151 |
| 2015/0368131 A1* | 12/2015 | Garrido Fernandez | C02F 3/301 210/605 |

* cited by examiner

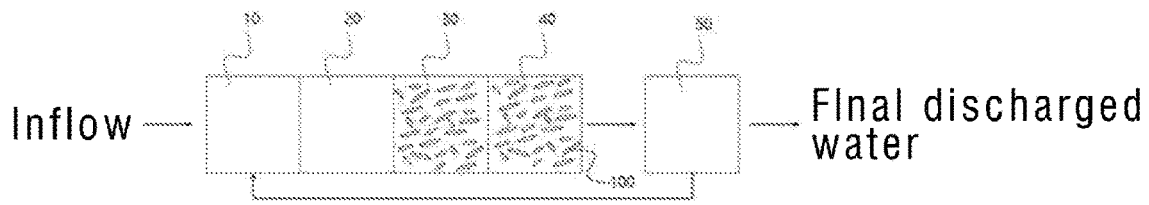

SEWAGE TREATMENT SYSTEM USING GRANULE

CROSS-REFERENCE TO RELATED APPLICATIONS

This application claims the priority of Korean Patent Application No. 2017-0124309 filed on Sep. 26, 2017, in the Korean Intellectual Property Office, the disclosure of which is incorporated herein by reference.

BACKGROUND

Field

The present invention relates to a system for treating nutrients such as nitrogen, phosphorus, and the like contained in sewage, and more particularly, to a sewage treatment system using granules, which includes an anoxic tank, an anaerobic tank, an intermittent aeration tank, and a settling tank, in which the intermittent aeration tank simultaneously removes organic and nitrogen from sewage through nitrification and denitrification by means of aerobic granules.

Description of the Related Art

Recently, as problems with green algae often occur, eutrophication caused by nitrogen, phosphorus, and the like becomes a serious social issue. The excessive inflows of nitrogen and phosphorus components into lakes, rivers, inland seas, or the like may not only cause problems with water environments or harmful health effects, but also degrade the social and economic value of water resources. The nitrogen component, which is represented by ammonia, has an adverse effect on aquatic organisms due to its own toxicity, and the nitrogen component is considered as a key contaminant in the modern society because the rate of occurrence of the nitrogen component is increased in proportion to an increase in population and industrial developments. Therefore, a high-level treatment technology for treating nitrogen has been consistently developed in addition to a sewage treatment process which has been represented as an active sludge method in the related art for removing the nitrogen components, and the high-level treatment includes a nitrification step including ammonia oxidation for oxidizing ammonia to form nitrous acid under an aerobic condition and nitrous acid oxidation for oxidizing the nitrous acid to form nitric acid, and a denitrification step of reducing the nitrous acid oxidized under the anoxic condition or the nitric acid to form nitrogen. In this regard, in the case of a suspended growth type active sludge process which has been generally used for the existing high-level treatment of sewage and waste, it was difficult to improve efficiency because a proportion of microorganisms, which perform the nitrification among the entire microorganisms in a nitrification tank, is low at a level of 2 to 10%, and particularly, it was significantly difficult to improve efficiency in response to a change in environment because an autotrophic oxidizing bacteria, which is a nitrifying microorganism, is low in yield and proliferation rate and sensitive to a change in temperature, interfering substance, and pH in comparison with a denitrifying bacteria. Furthermore, the suspended nitrifying microorganisms are eaten by rotifers, which are higher organisms present in the sludge, such that the growth of the nitrifying microorganisms is restricted, and as a result, a technology for maintaining the nitrifying microorganisms at high concentration has been mainly developed. Among the existing technologies for maintaining the nitrifying microorganism at high concentration, a nitrifying microorganism enrichment culture method, which is disclosed in Korean Patent Application Laid-Open No. 10-2008-0047664 for improving efficiency in removing nitrogen, is proposed to improve efficiency of the enrichment culture method of culturing, at high concentration, nitrosomonas europaea which is a main nitrifying microorganism, and to improve efficiency of a process of removing nitrogen using the enrichment culture method, but it is difficult to optimize a condition for culturing the nitrosomonas europaea in situ, and there is a problem in that the nitrosomonas europaea needs to be periodically supplied in a case in which the nitrosomonas europaea is washed out or eliminated from substrate competition. As other methods, there have been known an entrapping immobilization method of entrapping microorganisms in a polymeric carrier for immobilizing the microorganisms, a natural attaching method of allowing microorganisms to be naturally attached to a carrier, a covalently bonding method of chemically treating microorganisms and bonding the microorganisms together, and an adsorbing method of physically bonding microorganisms to a carrier, but as disclosed in Korean Patent Application Laid-Open No. 10-2007-0009803 and Korean Patent No. 10-0455335, in a case in which a biofilm is formed on the carrier, to which the nitrifying microorganisms may be attached so as to be grown, in order to maintain the nitrifying microorganisms at high concentration, there is a problem in that non-uniform mixtures are formed in a reactor and the microorganisms are attached and eliminated in the reactor, and as a result, it is difficult to perform maintenance because of periodical replacement of the carrier, which causes problems with costs. Alginate, kappa-carrageenan, gelatin, agar, and the like have been known as the entrapping immobilization method reported as a microorganism immobilizing method, and the alginate, the kappa-carrageenan, and the like are mainly used as a microorganism carrier matrix, but as disclosed in Korean Patent No. 10-0460461, in a case in which sewage is treated by immobilizing the microorganisms by mixing a filling material, a carrier matrix for a core, a carrier matrix for coating, and the like with sludge including the nitrifying microorganisms in a thickener tank of a sewage treatment facility, there may be a problem in that activity deteriorates due to a lack of oxygen of the nitrifying microorganisms in a space in which the nitrifying microorganisms are immobilized.

DOCUMENTS OF RELATED ART

Patent Documents (Patent Document 0001) Korean Patent Application Laid-Open No. 10-2008-0047664
(Patent Document 0002) Korean Patent Application Laid-Open No. 10-2007-0009803
(Patent Document 0003) Korean Patent No. 10-0455335
(Patent Document 0004) Korean Patent No. 10-0460461

SUMMARY

The present invention has been made in an effort to solve the aforementioned problems, and an object of the present invention is to provide a sewage treatment system using granules, which is capable of removing nitrogen, phosphorus, and the like in response to a change in external environment such as deterioration in temperature, and capable of continuously performing a treatment.

In this regard, another object of the present invention is to provide a process capable of agglomerating high-concentration nitrifying microorganisms at high concentration without using a carrier or an immobilizing method, capable of maintaining activity under a condition in which oxygen concentration is high, and capable of improving the problem in that an external carbon source is necessarily required to ensure electron donors during denitrification, thereby enabling denitrification without additionally inputting the electron donors.

In addition, still another object of the present invention is to provide a sewage treatment system capable of minimizing deterioration in activity of the nitrifying microorganisms even at a low temperature of 13° C. or lower.

To solve the aforementioned problems, a sewage treatment system according to the present invention includes: an anoxic tank which has a sewage inlet port into which sewage is introduced; an anaerobic tank which is connected to the anoxic tank; intermittent aeration tanks which are connected to the anaerobic tank, have two or more separately divided spaces, and have, in the spaces, granules and aeration devices that alternately operate; and a settling tank which is connected to the intermittent aeration tanks.

Here, the two intermittent aeration tanks may be connected in series, and the second intermittent aeration tank and the anoxic tank may be connected through a conveying pipe for conveying a liquid.

In addition, air to be supplied to the aeration tank may have a temperature of 30° C. or higher, and the air to be supplied to the aeration tank may be heated while passing through a heat exchanger.

A method of operating a sewage treatment system according to the present invention includes: a first step of introducing sewage; a second step of allowing the introduced sewage to pass through an anoxic tank and to be supplied with carbon; a third step of allowing the sewage passing through the anoxic tank to be introduced into an anaerobic tank; a fourth step of allowing the sewage passing through the anaerobic tank to be introduced into a first intermittent aeration tank and a second intermittent aeration tank which include aeration devices and granules including nitrogen treatment microorganisms; a fifth step of allowing the first intermittent aeration tank to be in an aeration state and the second intermittent aeration tank to be in a non-aeration state; and a sixth step of allowing the first intermittent aeration tank to be in the non-aeration state and the second intermittent aeration tank to be in the aeration state.

Here, the sewage in the anoxic tank may not be discharged to the anaerobic tank in the fifth step, and the sewage in the anoxic tank may be discharged to the anaerobic tank in the sixth step.

In addition, the method of operating the sewage treatment system according to the present invention may include a seventh step of allowing the sewage in the second intermittent aeration tank to be introduced into a settling tank when the first intermittent aeration tank is in the aeration state and the second intermittent aeration tank is in the non-aeration state.

In addition, in the method of operating the sewage treatment system according to the present invention, a temperature of the introduced sewage may be 13° C. or lower, and total nitrogen concentration of final treated water may be 10 mg/L or less when total nitrogen concentration is 50 mg/L or less.

The sewage treatment system using granules according to the present invention agglomerates the nitrifying microorganisms at high concentration without using a carrier or microorganism immobilization, and as a result, it is easy to meet an operating condition in situ, and it is possible to minimize deterioration in activity of the nitrifying microorganisms even though an environment such as a temperature is changed. In particular, regarding a decrease in temperature, warm air is used for aeration, and as a result, it is possible to cope with a rapid decrease in temperature in the winter season.

In addition, the sewage treatment system according to the present invention is provided with a plurality of intermittent aeration tanks in comparison with the existing arrangement, and as a result, the plurality of intermittent aeration tanks may be continuously operated, such that the amount of waste water, which may be treated per unit time, may be increased.

In addition, the anoxic tank is positioned at the front end of the sewage treatment system according to the present invention, and as a result, the denitrification may be performed without artificially inputting an electron donor such as an organic substance.

BRIEF DESCRIPTION OF THE DRAWINGS

The above and other aspects, features and other advantages of the present disclosure will be more clearly understood from the following detailed description taken in conjunction with the accompanying drawings, in which:

FIG. 1 illustrates a process configuration of a sewage treatment system according to the present invention.

DETAILED DESCRIPTION OF THE PREFERRED EMBODIMENT

Hereinafter, a sewage treatment system using granules according to the present invention will be described with reference to the drawing.

In the present application, it will be appreciated that term "including", "having", or "comprising" is intended to indicate the presence of characteristics, numbers, steps, constituent elements, and components described in the specification or a combination thereof, and does not pre-exclude a possibility of the presence or addition of one or more other characteristics, numbers, steps, operations, constituent elements, and components, or a combination thereof.

In addition, all terms used herein including technical or scientific terms have the same meanings as meanings which are generally understood by those skilled in the technical field to which the present disclosure pertains unless they are differently defined. Terms defined in a generally used dictionary shall be construed that they have meanings matching those in the context of a related art, and shall not be construed in ideal or excessively formal meanings unless they are clearly defined in the present application.

The sewage treatment system using granules 100 according to the present invention illustrated in FIG. 1 includes an anoxic tank 10 which has a sewage inlet port into which sewage is introduced, an anaerobic tank 20 which is connected to the anoxic tank 10, intermittent aeration tanks 30 and 40 which are connected to the anaerobic tank 20, have two or more separately divided spaces, and have, in the spaces, the granules 100 and aeration devices that alternately operate, and a settling tank 50 which is connected to the intermittent aeration tanks 30 and 40. In the sewage treatment system according to the present invention, the sewage, which is introduced into the anoxic tank 10 which is a first process, is introduced into the anoxic tank 10 in a state in which a biochemical oxygen demand (BOD) is typically maintained at 150 mg/L or less, and in this case, the sewage is introduced with a total nitrogen content at a level of about 50 mg/L. Denitrification is performed by denitrifying microorganisms in the anoxic tank 10 of the sewage treatment system according to the present invention, and a denitrification reaction is expressed by the following reaction formula.

$$NO_3^- + 1.08CH_3OH + H^+ \rightarrow 0.065C_6H_7O_2N + 0.47N_2 + 0.76CO_2 + 2.44H_2O$$

In the anoxic tank 10, the component nitrified by the denitrifying microorganisms is reduced to form harmless nitrogen gas, and the nitrogen gas is discharged into the atmosphere, and the denitrifying microorganisms reduce $NO_3$ components to form nitrogen under an anoxic environment in which no oxygen is supplied and in a state in which organic substances are sufficiently supplied.

In the nitrogen treatment system according to the present invention, one or more denitrifying microorganisms including *micrococcus, pseudomonas, archomobacter*, and *bacillus* may be used. One of the important features of the sewage treatment system according to the present invention is that the denitrification reaction may be smoothly induced by using organic substances contained in the sewage during the denitrification process in which the organic substances need to be sufficiently supplied, without artificially inputting a carbon source unlike the related art. In the related art, the additional input of the organic substances needs to be inevitably performed for the denitrification because the anoxic tank 10 is positioned at a rear side of the aerobic tank where the nitrification reaction occurs and because concentration of the organic substances becomes extremely low while the organic substances pass through the aerobic tank, but the sewage treatment system according to the present invention is configured such that the anoxic tank 10 is positioned at the foremost end so that the sewage is directly introduced into the anoxic tank 10, and as a result, the denitrification reaction may be induced without artificially inputting the organic substances.

In the sewage treatment system according to the present invention, the anaerobic tank 20 is positioned at a rear end of the anoxic tank 10, a phosphorus compound contained in the sewage is decomposed in the anaerobic tank 20 by the microorganisms that discharge phosphorus, the phosphorus compound is changed to acetylcoenzyme by energy generated in this case, and then phosphate ions are discharged.

The introduced sewage, which passes through the anaerobic tank 20 from which phosphorus is discharged in the form of phosphate ions, is introduced into the intermittent aeration tanks 30 and 40 which are connected to the anaerobic tank 20, have the two or more separately divided spaces, and have, in the spaces, the granules 100 and the aeration devices that alternately operate. In the sewage treatment system according to the present invention, the two or more (plurality of) intermittent aeration tanks 30 and 40 are always provided to discharge treated supernatant water to the outside while alternately performing aeration and non-aeration and preventing the granules 100 from being discharged to the outside during the non-aeration. The granules 100 are manufactured by a manufacturing facility for separately manufacturing the granules 100 at a point in time at which the sewage treatment system according to the present invention begins to operate, and after the sewage treatment system operates, the granules 100 are manufactured and grown in the intermittent aeration tanks 30 and 40. In the intermittent aeration tanks 30 and 40 of the sewage treatment system according to the present invention, nitrification and absorption of phosphorus are mainly performed by the granules 100, and in addition, the organic substances are also removed. Specifically referring to the aforementioned process, the organic substances contained in the introduced sewage are removed as cells of the organic substances are grown by oxygen and nutrients supplied by the aeration and as the organic substances are changed to carbon dioxide, ammonia, and the like, and the nitrogen components produced in this case and the nitrogen components such as organic nitrogen already contained in the sewage are converted into ammonia nitrogen by aerobic microorganisms such as nitrosomonas, nitrobacter, and the like contained in the aerobic granule 100. After passing through the aforementioned process, the ammonia nitrogen is converted into nitrite nitrogen and nitric nitrogen by microorganisms that oxidize the ammonia nitrogen.

In the intermittent aeration tanks of the sewage treatment system according to the present invention, the aerobic granules 100 are included, the aerobic granules 100 includes nitrifying microorganisms for the nitrification, and as necessary, phosphorus removing microorganisms may also be included to form the granules 100. The phosphorus removing microorganism decomposes PHB (Poly-β-hydroxybutyrate) stored in the cell into oxygen in the aerobic state, obtains phosphate ions from the outside, and stores the phosphate ions in the form of poly-phosphate in the cell. The phosphorus compound, which is accumulated in the cell as described above, is transferred from the intermittent aeration tanks 30 and 40 to the anoxic tank 10, and the phosphorus is discharged from the anaerobic tank 20.

The intermittent aeration tank of the sewage treatment system according to the present invention has the following two features. The first feature is to perform the aeration with heated air in order to minimize deterioration in activity of the aerobic granule 100 caused by a rapid decrease in temperature in the winter season, and the second feature is to continuously operate the sewage treatment system according to the present invention while alternately operating the aeration and the non-aeration of the plurality of intermittent aeration tanks 30 and 40.

First, specifically referring to the first feature, the aeration is performed in the intermittent aeration tanks 30 and 40 with heated air at 30° C. or higher in order to prevent deterioration in activity of the aerobic granule 100 caused by a rapid decrease in temperature in the winter season. To this end, a heating device is required to heat air to be supplied to the aeration tank, and the heating device may be a heat exchanger. The air to be supplied to the intermittent aeration tanks 30 and 40 of the sewage treatment system according to the present invention is heated at 30° C. or higher while passing through the heat exchanger, and the heated air is supplied to the aeration device as described above, thereby raising a temperature in the intermittent aeration tanks 30 and 40 that include the granules 100.

Specifically referring to the continuous operating method which is the second feature of the intermittent aeration tank of the sewage treatment system according to the present invention, the two intermittent aeration tanks 30 and 40 may be connected in series, and the sewage passing through the anaerobic tank 20 is introduced into the first intermittent aeration tank 30 and the second intermittent aeration tank 40 which include the aeration devices and the granules 100 including nitrogen treatment microorganisms. Thereafter, the first intermittent aeration tank 30 is in the aeration state and the second intermittent aeration tank 40 is in the non-aeration state, and on the contrary, the first intermittent aeration tank 30 is in the non-aeration state and the second intermittent aeration tank 40 is in the aeration state. In this case, the sewage in the second intermittent aeration tank 40 is introduced into the settling tank 50 when the first intermittent aeration tank 30 is in the aeration state and the second intermittent aeration tank 40 is in the non-aeration state. Consequently, the two (first and second) intermittent aeration tanks 30 and 40 of the nitrogen treatment system according to the present invention do not perform the aeration and the non-aeration together, but the second aeration tank is always in the non-aeration state when the first aeration tank is in the aeration state, and the second aeration tank is always in the aeration state when the first aeration tank is in the non-aeration state. In addition, when the second aeration tank is in the non-aeration state, the sewage treated in the second aeration tank is introduced into the settling tank 50, which is the subsequent process, and the sewage is discharged from the second aeration tank. As described above, in the case of the first and second intermittent aeration tanks 30 and 40 which are connected in series in the sewage treatment system according to the present invention, the sewage is primarily aerated while passing through the first intermittent aeration tank 30, and then introduced into the second intermittent aeration tank 40, and when the aeration is completed in the second intermittent aeration tank 40, the sewage is discharged to the settling tank 50 after a predetermined non-aeration time. In the aforementioned process, when the sewage passing through the anaerobic tank 20 is introduced into the first intermittent aeration tank 30, the first intermittent aeration tank 30 operates in the aeration state, and in this case, the second intermittent aeration tank 40 is in the non-aeration state as described above. When the aeration is completed in the first intermittent aeration tank 30, the sewage treated in the first intermittent aeration tank 30 is introduced into the second intermittent aeration tank 40, and when the aeration begins to be performed in the second intermittent aeration tank 40, the sewage completely treated in the anaerobic tank 20 is introduced into the first intermittent aeration tank 30 which is in the non-aeration state. When the aeration is completed in the second intermittent aeration tank 40, the second intermittent aeration tank 40 is in the non-aeration state, and in this case, the first intermittent aeration tank 30 enters the aeration state.

The sewage passing through the intermittent aeration tanks 30 and 40 is introduced into the settling tank 50 as described above, solidified materials are settled in the settling tank 50, and a supernatant liquid separated from the solidified material is discharged.

A method of operating the nitrogen treatment system according to the present invention includes a first step of introducing sewage, a second step of allowing the introduced sewage to pass through the anoxic tank 10 and to be supplied with carbon, a third step of allowing the sewage passing through the anoxic tank 10 to be introduced into the anaerobic tank 20, a fourth step of allowing the sewage passing through the anaerobic tank 20 to be introduced into the first intermittent aeration tank 30 and the second intermittent aeration tank 40 which include the aeration devices and the granules 100 including the nitrogen treatment microorganisms, a fifth step of allowing the first intermittent aeration tank to be in the aeration state and the second intermittent aeration tank 40 to be in the non-aeration state, and a sixth step of allowing the first intermittent aeration tank 30 to be in the non-aeration state and the second intermittent aeration tank 40 to be in the aeration state. In this case, the method may include a seventh step of introducing the sewage passing through the anoxic tank 10 in the sixth step, allowing the first intermittent aeration tank 30 to be in the aeration state, and allowing the sewage in the second intermittent aeration tank 40 to be introduced into the settling tank 50 when the second intermittent aeration tank 40 is in the non-aeration state.

Example

Sewage with BOD of 100 to 150 mg/L and total nitrogen concentration of about 50 mg/L was introduced at 5 L/day into the anoxic tank 10, and after one hour, the sewage was introduced into the anaerobic tank 20. Micrococcus denitrifying microorganisms were included in the anoxic tank 10, and phosphorus-discharging microorganisms were included in the anaerobic tank 20. After one hour in the anaerobic tank 20, the sewage was introduced into the first intermittent aeration tank 30 and aerated for 30 minutes to 1 hour, and the sewage was introduced into the second intermittent aeration tank 40 and aerated for 30 minutes to 1 hour. The sewage was introduced into the first intermittent aeration tank 30 from the anaerobic tank 20 when the second intermittent aeration tank 40 was in the aeration state, and the second intermittent aeration tank 40 was maintained in the non-aeration state for 15 minutes to 30 minutes after the aeration was completed in the second intermittent aeration tank 40. The granules 100 including nitrosomonas and nitrobacter microorganisms were included in the first and second intermittent aeration tanks 30 and 40. After the non-aeration was completed in the second intermittent aeration tank 40 as described above, the supernatant water in the second intermittent aeration tank 40 was introduced into the settling tank 50. Total nitrogen concentration of the final discharged water passing through the settling tank 50 was detected as 10 mg/L or less.

Although the specific parts of the present disclosure have been described in detail, it will be obvious to those skilled in the art that such a specific description is just a preferred embodiment and the scope of the present disclosure is not limited thereby, and it will be apparent to those skilled in the art that various alterations and modifications are possible within the scope and technical spirit of the present disclosure, and it is natural that such alterations and modifications also fall within the accompanying claims.

What is claimed is:

1. A sewage treatment system comprising:
an anoxic tank which has a sewage inlet port into which sewage is introduced;
an anaerobic tank which is connected to the anoxic tank;
first and second intermittent aeration tanks which are connected to the anaerobic tank, define two or more separately divided spaces, and have, in the spaces, granules and aeration devices that alternately operate; and
a settling tank which is connected to the intermittent aeration tanks.

2. The sewage treatment system of claim 1, wherein the first and second intermittent aeration tanks are connected in series.

3. The sewage treatment system of claim 2, wherein the second intermittent aeration tank and the anoxic tank are connected through a conveying pipe for conveying a liquid.

4. The sewage treatment system of claim 1, wherein air to be supplied to the aeration tank has a temperature of 30° C. or higher.

5. The sewage treatment system of claim 4, wherein the air to be supplied to the aeration tank is heated while passing through a heat exchanger.

6. A method of operating a sewage treatment system, the method comprising:
- a first step of introducing sewage;
- a second step of allowing the introduced sewage to pass through an anoxic tank and to be supplied with carbon;
- a third step of allowing the sewage passing through the anoxic tank to be introduced into an anaerobic tank;
- a fourth step of allowing the sewage passing through the anaerobic tank to be introduced into a first intermittent aeration tank and a second intermittent aeration tank which include aeration devices and granules including nitrogen treatment microorganisms;
- a fifth step of allowing the first intermittent aeration tank to be in an aeration state and the second intermittent aeration tank to be in a non-aeration state; and
- a sixth step of allowing the first intermittent aeration tank to be in the non-aeration state and the second intermittent aeration tank to be in the aeration state.

7. The method of claim 6, wherein the sewage in the anoxic tank is not discharged to the anaerobic tank in the fifth step, and the sewage in the anoxic tank is discharged to the anaerobic tank in the sixth step.

8. The method of claim 6, comprising:
- a seventh step of allowing the sewage in the second intermittent aeration tank to be introduced into a settling tank when the first intermittent aeration tank is in the aeration state and the second intermittent aeration tank is in the non-aeration state.

9. The method of claim 6, wherein a temperature of the introduced sewage is 13° C. or lower, and total nitrogen concentration of final treated water is 10 mg/L or less when total nitrogen concentration is 50 mg/L or less.

* * * * *